(12) United States Patent
Jang et al.

(10) Patent No.: US 11,317,258 B2
(45) Date of Patent: Apr. 26, 2022

(54) METHODS, SYSTEMS, AND NON-TRANSITORY COMPUTER READABLE RECORD MEDIA FOR GRASPING NEARBY FRIEND BASED ON SHORT-RANGE WIRELESS COMMUNICATION

(71) Applicant: LINE Plus Corporation, Seongnam-si (KR)

(72) Inventors: Hyukjae Jang, Seongnam-si (KR); Donghyun Kim, Seongnam-si (KR); Hey Young Yun, Seongnam-si (KR); Jong Youn Ahn, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/110,508

(22) Filed: Dec. 3, 2020

(65) Prior Publication Data
US 2021/0092567 A1 Mar. 25, 2021

Related U.S. Application Data

(63) Continuation of application No. PCT/KR2018/006353, filed on Jun. 4, 2018.

(51) Int. Cl.
*H04W 4/21* (2018.01)
*H04W 4/029* (2018.01)
(Continued)

(52) U.S. Cl.
CPC ............. *H04W 4/21* (2018.02); *H04W 4/021* (2013.01); *H04W 4/029* (2018.02); *H04W 4/80* (2018.02)

(58) Field of Classification Search
CPC ....... H04W 4/021; H04W 4/029; H04W 4/21; H04W 4/80
See application file for complete search history.

(56) References Cited

U.S. PATENT DOCUMENTS

2010/0131385 A1* 5/2010 Harrang ............. G06Q 30/0277
705/26.1
2013/0152184 A1* 6/2013 Wang ...................... H04W 4/21
726/7
(Continued)

FOREIGN PATENT DOCUMENTS

KR 10-2002-0074304 A 9/2002
KR 10-2014-0095645 A 8/2014
(Continued)

*Primary Examiner* — David Bilodeau
(74) *Attorney, Agent, or Firm* — Harness, Dickey & Pierce, P.L.C.

(57) ABSTRACT

Disclosed is a method, system, and non-transitory computer-readable record medium for verifying a nearby friend based on a short-range wireless communication. A method of verifying a nearby friend based on a short-range wireless communication includes collecting, using processing circuitry, a plurality of device identifiers using short-range wireless communication, the plurality of device identifiers identifying a plurality of other electronic devices, transferring, using the processing circuitry, at least a portion of the plurality of device identifiers to a server, acquiring, using the processing circuitry, at least one social identifier from the server, each of the at least one social identifier being associated with a respective social network service (SNS) account, the at least one social identifier corresponding to the portion of the plurality of device identifiers, and providing the at least one social identifier through an interface of the electronic device.

20 Claims, 13 Drawing Sheets

(51) Int. Cl.
*H04W 4/80* (2018.01)
*H04W 4/021* (2018.01)

(56) References Cited

U.S. PATENT DOCUMENTS

| | | | | |
|---|---|---|---|---|
| 2013/0173798 A1* | 7/2013 | Micucci | .............. | H04L 67/1044 709/225 |
| 2013/0282438 A1* | 10/2013 | Hunter | ................ | H04W 12/084 705/7.32 |
| 2015/0127565 A1* | 5/2015 | Chevalier | .............. | G06Q 30/00 705/319 |
| 2016/0094963 A1* | 3/2016 | Gupta | ..................... | H04W 4/21 705/7.19 |
| 2016/0142857 A1* | 5/2016 | Lee | ........................ | G06Q 50/01 455/414.1 |
| 2021/0092567 A1* | 3/2021 | Jang | ..................... | H04W 4/021 |

FOREIGN PATENT DOCUMENTS

| KR | 10-2014-0119917 A | 10/2014 |
|---|---|---|
| KR | 101607218 B1 | 3/2016 |
| KR | 10-2016-0042291 A | 4/2016 |
| KR | 101760600 B1 | 7/2017 |

\* cited by examiner

FIG. 6
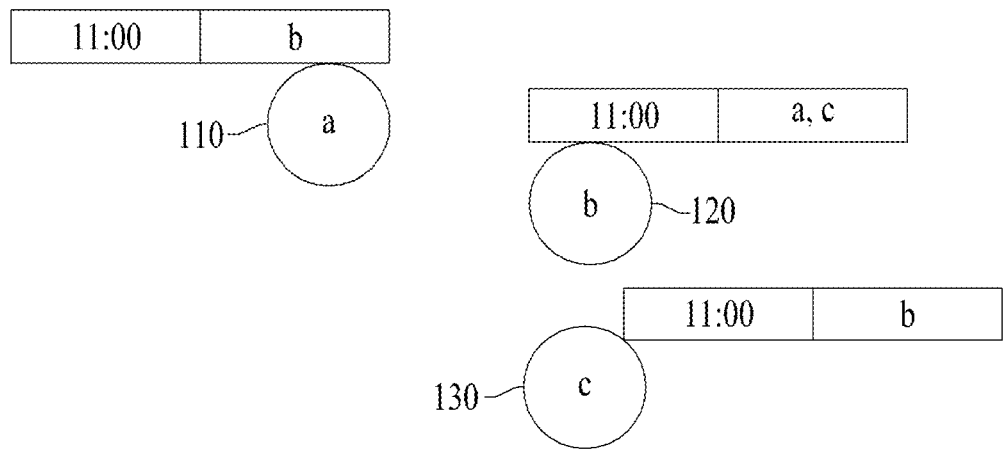
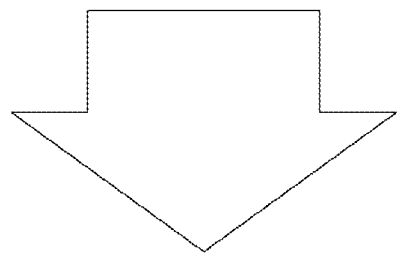
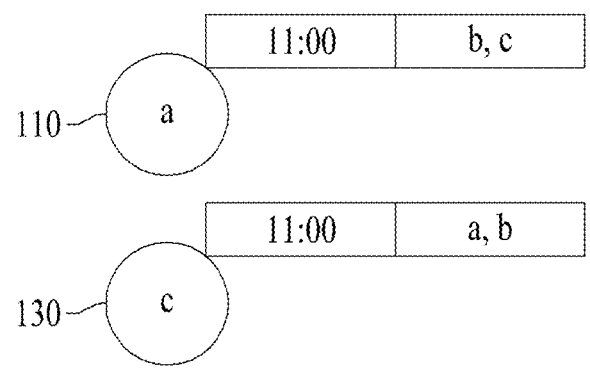

| Device identifier | Social identifier |
|---|---|
| a | A |
| b | B |
| c | C |
| d | D |
| e | E |
| f | F |
| g | G |
| h | H |
| ... | ... |

810

| Time | Device identifier |
|---|---|
| 11:00 | b, c |
| 14:00 | b, c, d, e, f |
| 14:05 | b, d, e |
| 14:35 | b, d |
| 14:40 | b, f, g, h |

1200

| Device identifier | Statistical value (count) |
|---|---|
| b | 5 |
| d | 3 |
| c | 2 |
| e | 2 |
| f | 2 |
| g | 1 |
| h | 1 |

METHODS, SYSTEMS, AND NON-TRANSITORY COMPUTER READABLE RECORD MEDIA FOR GRASPING NEARBY FRIEND BASED ON SHORT-RANGE WIRELESS COMMUNICATION

CROSS-REFERENCE TO RELATED APPLICATIONS

This U.S. non-provisional application is a continuation application of, and claims the benefit of priority under 35 U.S.C. § 365(c) to, International Application No. PCT/KR2018/006353, filed Jun. 4, 2018, the entire contents of which are incorporated herein by reference in their entirety.

TECHNICAL FIELD

Some example embodiments relate to technology for finding a nearby acquaintance, for example, a nearby friend.

RELATED ART

An instant messenger that is a general communication tool refers to software capable of sending and receiving messages or data in real time. A user may register a contact on a messenger and may exchange messages with a counterpart included in a contact list in real time.

Such a messenger function is popular in mobile environments of a mobile communication terminals as well as a personal computers (PCs).

For example, technology exists for a mobile messenger service system and method of a portable terminal using a wireless communication network to provide a messenger service between mobile messengers installed on portable terminals.

SUMMARY

Some example embodiments may verify a nearby acquaintance, for example, a nearby friend using a short-range wireless communication and a social network service (SNS) relationship and may provide various functions or services using the same.

According to an aspect of some example embodiments, there is provided a method implemented by an electronic device including processing circuitry, the method including collecting, using the processing circuitry, a plurality of device identifiers using short-range wireless communication, the plurality of device identifiers identifying a plurality of other electronic devices, transferring, using the processing circuitry, at least a portion of the plurality of device identifiers to a server, acquiring, using the processing circuitry, at least one social identifier from the server, each of the at least one social identifier being associated with a respective social network service (SNS) account, the at least one social identifier corresponding to the portion of the plurality of device identifiers, and providing the at least one social identifier through an interface of the electronic device.

The collecting may include storing a list of device identifiers collected for each of a plurality of periods, the list of device identifiers storing the plurality of device identifiers in association with time information of a corresponding period among the plurality of periods.

The collecting may include collecting a respective device identifier collected by each of the plurality of other electronic devices at the corresponding period from the plurality of other electronic devices through the short-range wireless communication.

The collecting may further include storing position information acquired by the electronic device in association with each of the plurality of periods.

The portion of the plurality of device identifiers may be based on a search condition specified by a user of the electronic device.

The server may be configured to maintain an identifier matching table comprising a respective identifier pair among a plurality of identifier pairs for each of a plurality of users using the SNS, each of the plurality of identifier pairs matching a respective device identifier and a respective social identifier, and detect a set of social identifiers corresponding to the portion of the plurality of device identifiers using the identifier matching table.

The set of social identifiers may include a plurality of social identifiers. The server may be configured to select the at least one social identifier from among the plurality of social identifiers based on an SNS relationship of a user of the electronic device.

The server may be configured to select the at least one social identifier from among the plurality of social identifiers based on an SNS relationship within a range set by a user of the electronic device.

The providing may include grouping and displaying the at least one social identifier based on a time at which a respective device identifier among the plurality of device identifiers corresponding to each of the at least one social identifier is stored.

The method may further include calculating, by the processing circuitry, statistical information about the plurality of device identifiers. The providing may include sorting and displaying the at least one social identifier based on the statistical information of a respective device identifier among the plurality of device identifiers corresponding to each of the at least one social identifier.

The providing may include providing a function within an SNS or a service linkable to the SNS using the at least one social identifier based on a selection through the interface.

According to an aspect of some example embodiments, there is provided a non-transitory computer-readable record medium storing computer-readable instructions that, when executed by at least one processor, cause the at least one processor to perform the method.

According to an aspect of some example embodiments, there is provided an electronic device including processing circuitry. The processing circuitry may be configured to collect a plurality of device identifiers using short-range wireless communication, the plurality of device identifiers identifying a plurality of other electronic devices, transfer at least a portion of the plurality of device identifiers to a server, acquire at least one social identifier from the server, each of the at least one social identifier being associated with a respective social network service (SNS) account, the at least one social identifier corresponding to the portion of the plurality of device identifiers, and provide the at least one social identifier through an interface of the electronic device.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIGS. 5 and 6 illustrate examples of describing a process of collecting a device identifier according to some example embodiments;

FIG. 7 illustrates an example of an identifier matching table according to some example embodiments;

DETAILED DESCRIPTION

Figure 1:
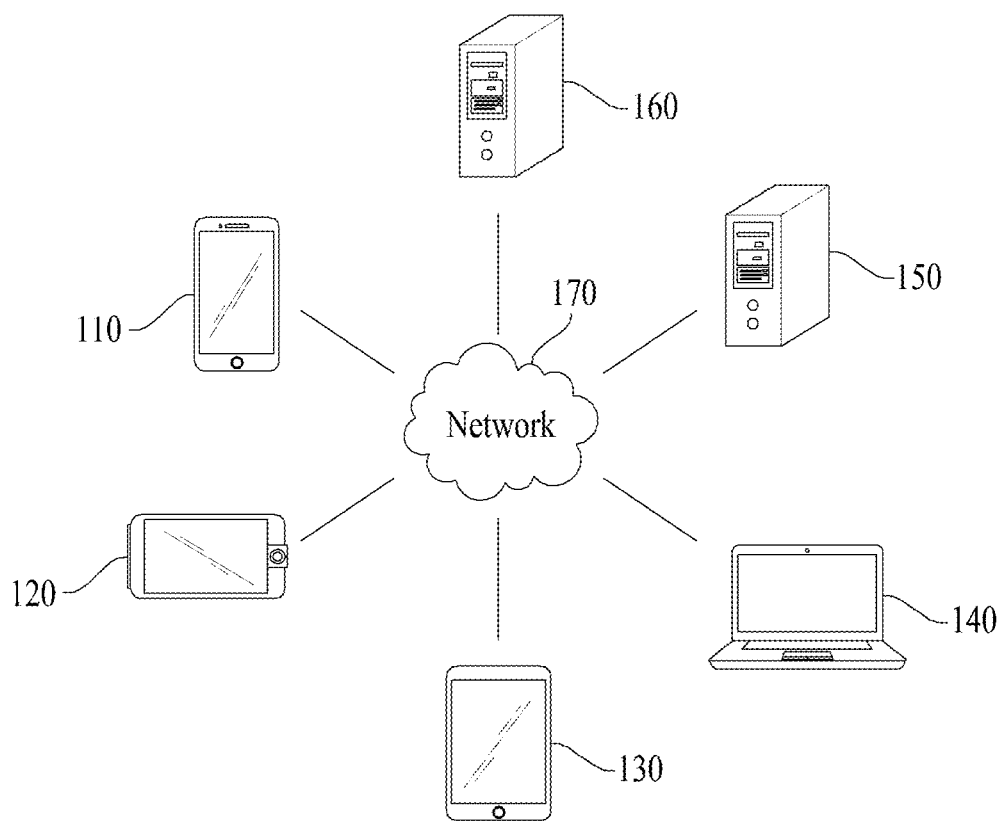
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Some example embodiments relate to technology for finding a nearby acquaintance, for example, a nearby friend (hereinafter, referred to as a nearby friend), and more particularly, to technology for verifying a nearby friend using a short-range wireless communication and a social network service (SNS) relationship.

Some example embodiments including the disclosures described herein may verify a nearby friend using a short-range wireless communication and an SNS relationship and may achieve many advantages in terms of efficiency, convenience, usability, service expandability, and/or cost saving.

FIG. 1 illustrates an example of a network environment according to some example embodiments. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto.

Each of the plurality of electronic devices 110, 120, 130, and/or 140 may be a fixed terminal or a mobile terminal that is configured as a computer system. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and/or the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a short-range wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In detail, the server 150 may provide a service (e.g., a social network service (SNS), etc.) intended (e.g., requested) by an application, the application may be a computer program installed and executed on the plurality of electronic devices 110, 120, 130, and/or 140, as the first service. As another example, the server 160 may provide a service that distributes a file for installing and executing the application to the plurality of electronic devices 110, 120, 130, and/or 140, as the second service.

Figure 2:
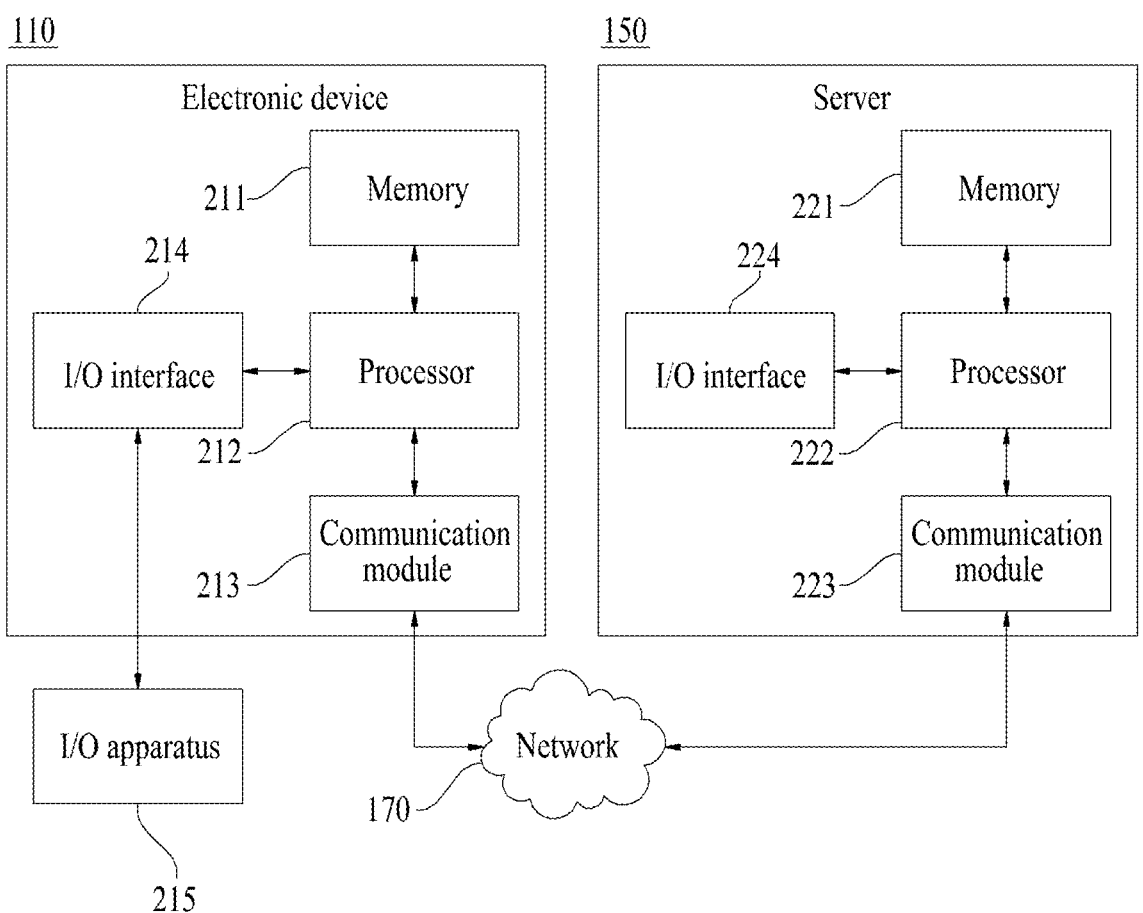
FIG. 2 is a diagram illustrating an example of an electronic device and a server according to some example embodiments.

FIG. 2 is a block diagram illustrating an example of an electronic device and a server according to some example embodiments. Description is made using the electronic device 110 as an example of an electronic device and the server 150 as an example of a server with reference to FIG. 2. Also, the other electronic devices 120, 130, and/or 140, and/or the server 160, may have the same or a similar configuration as that of the electronic device 110 or the server 150.

Referring to FIG. 2, the electronic device 110 may include a memory 211, a processor 212, a communication module 213, and/or an input/output (I/O) interface 214, and the server 150 may include a memory 221, a processor 222, a communication module 223, and/or an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as the ROM, SSD, flash memory, and/or disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to some example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 with another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215 (e.g., an input device and/or an output device). For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to some example embodiments, the electronic device 110 and the server 150 may include a smaller or greater number of components than a number of components shown in FIG. 2. However, some components according to the related art are not illustrated in detail. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, a method and system for verifying a nearby friend based on a short-range wireless communication according to some example embodiments is described.

Figure 3:
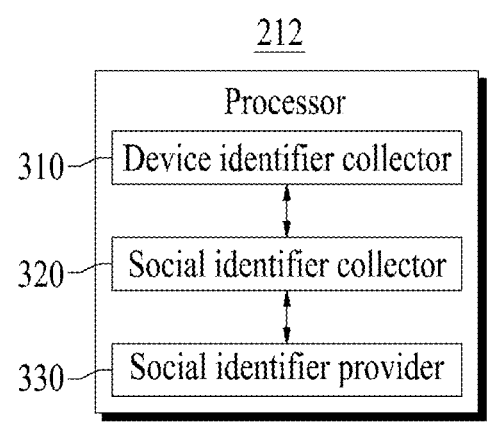
FIG. 3 is a diagram illustrating an example of components includable in a processor of an electronic device according to some example embodiments.
Figure 4:
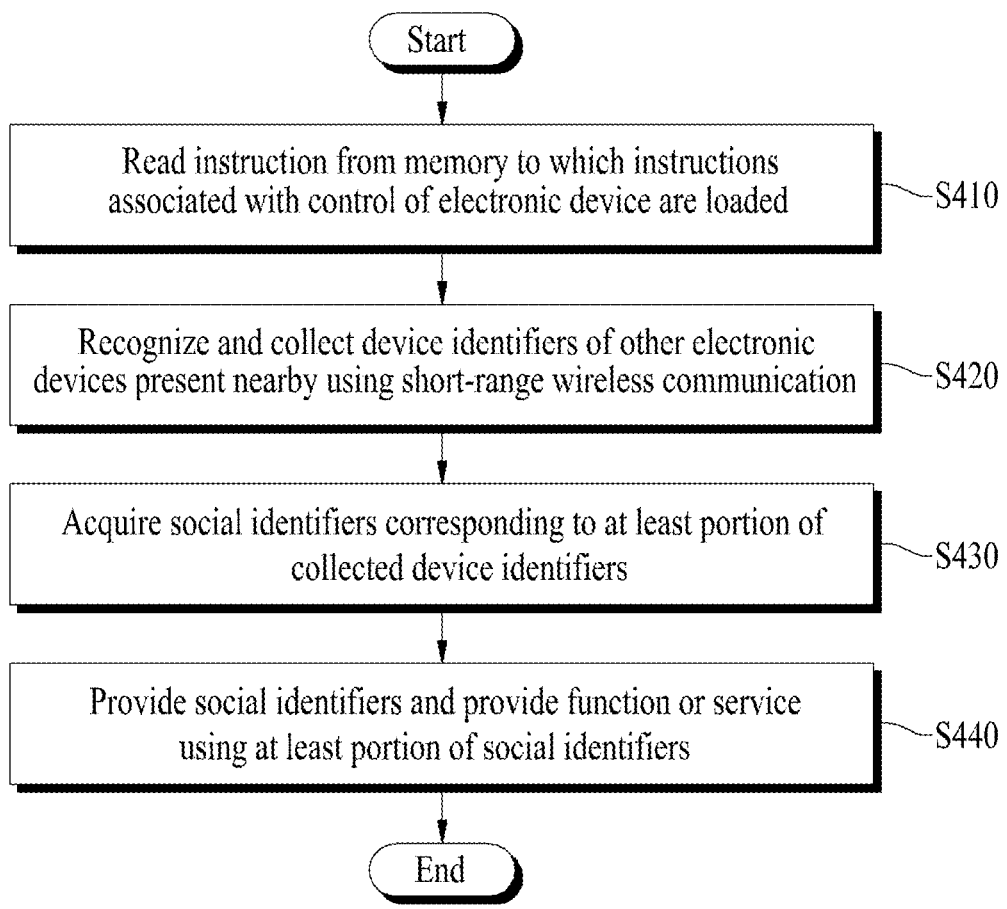
FIG. 4 is a flowchart illustrating an example of a method performed by an electronic device according to some example embodiments.

FIG. 3 is a diagram illustrating an example of components includable in a processor of an electronic device according to some example embodiments, and FIG. 4 is a flowchart illustrating an example of a method performed by an electronic device according to some example embodiments.

A nearby friend verifying system implemented as a computer may be configured in the electronic device 110 according to some example embodiments. For example, the nearby friend verifying system may be configured in a form of a program that independently operates or may be configured in an in-app form of a specific application to be operable on the specific application. Depending on some example embodiments, the nearby friend verifying system may provide an SNS, for example, a messenger, through interaction with the server 150.

In response to an instruction provided from an application installed on the electronic device 110, the nearby friend verifying system configured in the electronic device 110 may perform the nearby friend verifying method of FIG. 4.

Referring to FIG. 3, to perform the nearby friend verifying method of FIG. 4, the processor 212 of the electronic device 110 may include a device identifier collector 310, a social identifier acquirer 320, and/or a social identifier provider 330. Depending on some example embodiments, components of the processor 212 (e.g., the device identifier collector 310, the social identifier acquirer 320 and/or the social identifier provider 330) may be included in or excluded from the processor 212. Also, depending on some example embodiments, components of the processor 212 may be separated or merged for functional representation of the processor 212. According to some example embodiments, operations described herein as being performed by the electronic device 110, the processor 212, the device identifier collector 310, the social identifier acquirer 320, the social identifier provider 330, the server 150 and/or the processor 222 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The processing circuitry (e.g., the processor 212 and the components of the processor 212) may control the electronic device 110 to perform operations S410 to S440 included in the nearby friend verifying method of FIG. 4. For example, the processor 212 and the components of the processor 212 may be configured to execute an instruction according to a code of at least one program, and/or a code of an OS, included in the memory 211.

Here, the components of the processor 212 may be representations of different functions of the processor 212 performed by the processor 212 in response to an instruction (e.g., an instruction provided from an application executed on the electronic device 110) provided from a program code stored in the electronic device 110. For example, the device identifier collector 310 may be used as a functional representation of the processor 212 to control the electronic device 110 to collect identifiers of the other electronic devices 120, 130, and/or 140 in response to the instruction.

Referring to FIG. 4, in operation S410, the processor 212 may read an instruction from the memory 211 to which instructions associated with control of the electronic device 110 are loaded. In this case, the read instruction may include an instruction for controlling the processor 212 to perform the following operations S420 to S440.

In operation S420, the device identifier collector 310 may recognize and collect device identifiers for identifying the other electronic devices 120, 130, and/or 140 using a short-range wireless communication. The short-range wireless communication refers to wireless communication technology capable of transferring information without mutual contact at a close distance and may include, for example, Bluetooth, wireless fidelity (WiFi), ZigBee, and/or Near Field Communication (NFC). For example, the electronic device 110 may perform Bluetooth communication, may discover data of Bluetooth (e.g., a Bluetooth signal) and may perform mutual exchange between the electronic devices 110, 120, 130, and/or 140 based on a Generic Attribute Profile (GATT). The device identifier collector 310 may acquire the device identifiers of the other electronic devices 120, 130, and/or 140 present around the electronic device 110 (e.g., within range of Bluetooth communication) at desired periods through the short-range wireless communication during execution of an application installed on the electronic device 110. The device identifiers refer to unique device identification information used to identify the corresponding electronic devices 110, 120, 130, and/or 140 during a short-range wireless communication process, and may use a universally unique identifier (UUID), an identifier (ID) directly set by a user or an identifier separately assigned from (e.g., by) the server 150. For example, the device identifier collector 310 may store a list of device identifiers collected for each period in association with time information of a corresponding period by using a desired time unit (e.g., duration, such as 5 minutes) as the corresponding period. Here, the device identifier collector 310 may compare a list of device identifiers collected for a current period to a previously stored list of device identifiers of a previous period and, if they are identical or similar, may not store the list of device identifiers collected for the current period. If the list of device identifiers collected for the current period and the previously stored list of device identifiers of a previous period differ from each other, the device identifier collector 310 may store the list of device identifiers collected for the current period and time information of the corresponding period. This is to prevent the same, or a similar, list of device identifiers collected for consecutive periods from being redundantly stored or reduce the occurrence thereof. The device identifier collector 310 may also further include and store position information acquired by the electronic device 110 (e.g., a position detected by a GPS receiver in the electronic device 110) with respect to the list of device identifiers collected for each period.

In operation S430, in response to a request from a user of the electronic device 110, the social identifier acquirer 320 may transfer at least a portion of the device identifiers collected in operation S420 to the server 150 and may acquire, from the server 150, social identifiers corresponding to the at least a portion of the device identifiers. Here, a social identifier refers to a service account used for a user of an electronic device, for example, the electronic device 110, 120, 130 and/or 140, to use an SNS and may represent unique information used to identify a user of a corresponding electronic device, for example, the electronic device 110, 120, 130 and/or 140, at the SNS. For example, based on a search condition, for example, a date and a position, specified by the user of the electronic device 110, the social identifier acquirer 320 may transfer a device identifier corresponding to the search condition to the server 150 and may request a social identifier. The server 150 may store and maintain in advance an identifier matching table including an identifier pair, matching a device identifier and a social identifier, for each of the users using the SNS. If device identifiers are transferred from the electronic device 110, the server 150 may detect a social identifier corresponding to each of the device identifiers from (e.g., using) the identifier matching table and may provide the detected social identifiers to the electronic device 110. Here, using a social relationship (hereinafter, also referred to as an SNS relationship) established between users at the SNS, the server 150 may select a social identifier corresponding to an SNS relationship of the user of the electronic device 110 from among the social identifiers corresponding to the device identifiers transferred from the electronic device 110 and may provide the selected social identifier. The SNS relationship may include a direct friend relationship with the user of the electronic device 110 and may also include an indirect friend relationship, for example, a friend of the user's friend, a friend of that friend, and another user included in a chatroom joined by the user, which is not the direct friend relationship with the user. Here, the friend range for detecting a social identifier for each user may be preset or alternatively, given beyond a direct friend relationship. According to some example embodiments, the friend range may be a number of users having an intermediate friend relationship connecting the user with the other user. For example, a friend range of one may permit detection of a social identifier associated with another user that is a friend of a friend of the user even though the other user does not have a direct friend relationship with the user. The server 150 may select a social identifier corresponding to the SNS relationship within the preset or alternatively, given range from among the social identifiers corresponding to the device identifiers transferred from the electronic device 110 and may provide the selected social identifier to the electronic device 110.

In operation S440, the social identifier provider 330 may provide the social identifiers acquired from the server 150 to the user of the electronic device 110 through an interface capable of grouping the social identifiers, and may provide a function within the SNS or a service linkable to the SNS using at least a portion of the social identifiers selected through the interface. For example, the social identifier provider 330 may group and display the social identifiers acquired from the server 150 based on a time at which a device identifier corresponding to each social identifier is stored, and, in response to a selection on at least one group by the user of the electronic device 110 from among grouped social identifier groups, may provide a function or a service using a social identifier of a corresponding group. As another example, the social identifier provider 330 may sort and display at least a portion of the social identifiers based on a time unit at which a device identifier corresponding to each social identifier is stored and statistical information, such as a count, with respect to the social identifiers acquired from the server 150, and may provide a function or a service using at least one social identifier selected by the user of the electronic device 110. For example, the social identifier provider 330 may create a chatroom or add a friend using a result of grouping or sorting social identifiers and may provide, for example, a chat service and/or a money transfer service accordingly.

Hereinafter, technology for verifying an acquaintance, for example, a friend nearby in the past based on a short-range wireless communication is further described.

Figure 5:
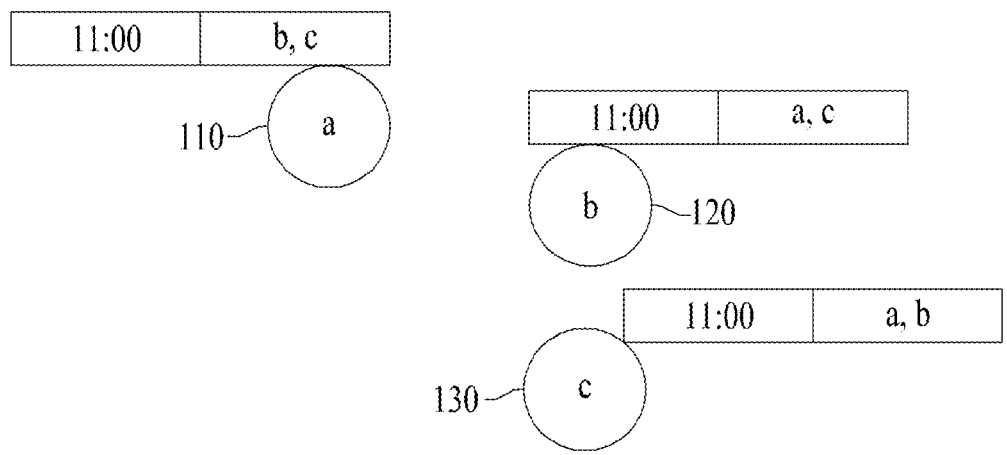

FIGS. 5 and 6 illustrate examples of describing a process of collecting a device identifier according to some example embodiments.

Referring to FIG. 5, with the assumption that the users of the electronic devices 110, 120, and 130 are present together at a specific point in time, for example, at 11 a.m. on May 1, 2018, the electronic device 110 corresponding to a device identifier a may collect device identifiers b and c, the electronic device 120 corresponding to the device identifier b may collect the device identifiers a and c, the electronic device 130 corresponding to the device identifier c may collect the device identifiers a and b.

Referring to FIG. 6, with the assumption that the electronic device 110 and the electronic device 130 are unable to recognize each other due to the presence of an obstacle therebetween, the electronic device 110 corresponding to the device identifier a collects the device identifier b, the electronic device 120 corresponding to the device identifier b collects the device identifiers a and c, the electronic device 130 corresponding to the device identifier c collects the device identifier b. Here, the electronic devices 110, 120, and 130 may share device identifiers collected for the same period, or a similar period, through a short-range wireless communication, the electronic device 110 may additionally collect the device identifier c from the electronic device 120, and the electronic device 130 may also additionally collect the device identifier a from the electronic device 120.

A security issue during a process of sharing a device identifier may be solved using the following method.

For example, based on a client-based security policy, in a process in which the electronic device 110 additionally collects the device identifier c from the electronic device 120, the electronic device 120 may initially determine a relationship between the user of the electronic device 120 and the user of the electronic device 110, and may determine whether to share the device identifier c. Each of the electronic devices 110, 120, and 130 may store and maintain in advance an identifier matching table including an identifier pair that match a device identifier and a social identifier of another user having an SNS relationship with a corresponding user (e.g., the user of the respective electronic device 110, 120 or 130), and may determine a relationship (e.g., a friend, a friend of the friend, and a stranger) with a counterpart by referring to the identifier matching table. In response to a request for sharing a device identifier from the electronic device 110, or in response to determining whether to share a device identifier with the electronic device 110, the electronic device 120 may determine a relationship between the user of the electronic device 120 and the user of the electronic device 110, or a relationship between the user of the electronic device 130 and the user of the electronic device 110, based on the identifier matching table. If the device identifier a of the electronic device 110 is absent in the identifier matching table, or if an SNS relationship between the user of the electronic device 130 and the user of the electronic device 110 is unverifiable from the identifier matching table, the electronic device 120 may verify the SNS relationship through inquiry to the server 150. The electronic device 120 may determine whether to transfer the collected device identifier c to the electronic device 110 based on the relationship with the user of the electronic device 110, or the relationship between the user of the electronic device 130 and the user of the electronic device 110.

Another example relates to a postprocessing server-based security policy instead of sharing a device identifier between devices using a short-range wireless communication. The server 150 may receive a device identifier collected at a specific point in time from the electronic device 110, may detect a social identifier corresponding to the device identifier from the identifier matching table, and may provide the detected social identifier to the electronic device 110. Here, the server 150 may additionally detect identifier information about a device included in a list of device identifiers of the corresponding point in time, for example, another device collected by the electronic device 120 and may provide the detected identifier information to the electronic device 110. Referring to FIG. 6, if the electronic device 110 transfers the device identifier b collected at 11:00 on May 1, 2018, to the server 150, the server 150 may verify whether a device identifier of the same point, or a similar point, in time (e.g., 11:00) transferred from the electronic device 120 corresponding to the device identifier b is present. Here, in response to absence of the device identifier of the same point, or a similar point, in time (e.g., 11:00) transferred from the electronic device 120, the server 150 may request the electronic device 120 and may receive identifier information about another device collected by the electronic device 120. In this manner, the server 150 may recognize that the electronic device 130 corresponding to the device identifier c is also nearby the electronic device 110 based on the device identifiers a and c of the same point, or a similar point, in time (e.g. 11:00) transferred from the electronic device 120. Here, the server 150 may verify an SNS relationship of each of the electronic devices 110, 120, and 130 corresponding to the device identifiers a, b, and c by referring to the identifier matching table including an identifier pair that match a device identifier and a social identifier, and may determine whether to transfer identifier information about another device collected by the electronic device 120 to the electronic device 110.

Therefore, in the case of a device that is nearby but unrecognizable due to presence of an obstacle, a device identifier recognized and collected by another nearby device may be shared. In this manner, all of nearby devices may be collected without omission.

FIG. 7 illustrates an example of an identifier matching table 700 according to some example embodiments.

Referring to FIG. 7, the server 150 may build in advance an identifier matching table 700 by matching a device identifier and a social identifier for each of a plurality of users using an SNS.

A device identifier refers to unique device identification information used to identify a corresponding electronic device, for example, the electronic device 110, 120, 130, and/or 140, during a short-range wireless communication process and may use an UUID of a device itself, an ID directly set by a user or an identifier separately assigned from the server 150.

A social identifier refers to a service account used for (e.g., by) a user of a corresponding electronic device, for example, the electronic device 110, 120, 130 and/or 140, to use (e.g., access) an SNS, and may represent unique information used to identify a user of a corresponding electronic device, for example, the electronic device 110, 120, 130 and/or 140, at the SNS.

The server 150 may construct in advance the identifier matching table 700. The device identifier and/or the social identifier may be corrected and/or updated by the server 150 and/or the user of the electronic device 110, 120, 130 and/or 140.

Figure 8:
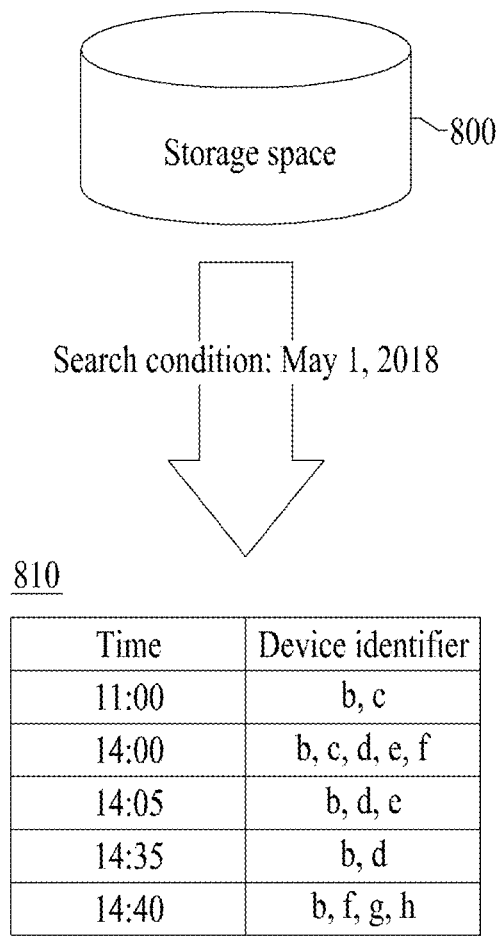
FIGS. 8 and 9 illustrate examples of describing a process of acquiring a social identifier according to some example embodiments.
Figure 9:
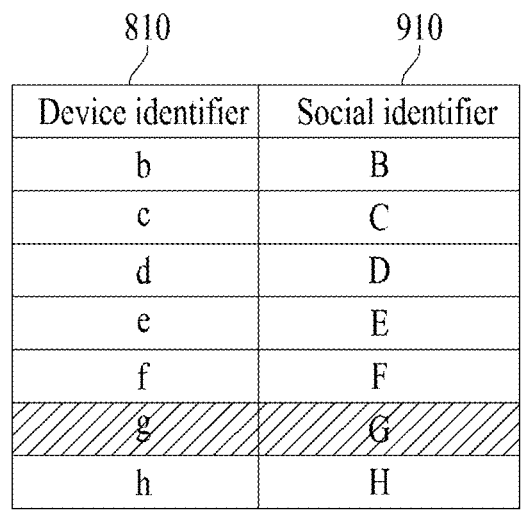

FIGS. 8 and 9 illustrate examples of describing a process of acquiring a social identifier according to some example embodiments.

Referring to FIG. 8, the social identifier acquirer 320 may extract a list of device identifiers 810 corresponding to a search condition input from the user of the electronic device 110 from among device identifiers that are collected by the device identifier collector 310 and stored in a storage space 800, for example, the memory 211, of the electronic device 110. For example, if the user searches for a device identifier collected on "May 1, 2018," the social identifier acquirer 320 may select the list of device identifiers 810 collected on May 1, 2018 from the storage space 800 and may transfer the selected list of device identifiers 810 to the server 150. In addition to conducting a search by setting a time and/or date as a condition, a search may be conducted by using a place where a device identifier is collected (e.g., position information, such as a position detected by a GPS receiver in the electronic device 110) as a condition.

In response to receiving the list of device identifiers 810 from the electronic device 110, the server 150 may detect, from the identifier matching table 700, a social identifier corresponding to each device identifier included in the list of device identifiers 810. Here, the server 150 may select a social identifier corresponding to an SNS relationship of the user of the electronic device 110, may select a social identifier corresponding to a friend range preset or alternatively, given by the user of the electronic device 110, and may provide the selected social identifier to the electronic device 110.

Referring to FIG. 9, if the list of device identifiers 810 transferred from the electronic device 110 includes device identifiers b, c, d, e, f, g, and h, social identifiers B, C, D, E, F, G, and H are detected from a list of social identifiers 910 corresponding to the list of device identifiers 810. Here, with the assumption that the social identifier G is not included in the friend range set by the user of the electronic device 110, the remaining social identifiers B, C, D, E, F, and H excluding the social identifier G may be transferred to the electronic device 110 as a final result with respect to the list of device identifiers 810.

Figure 10:
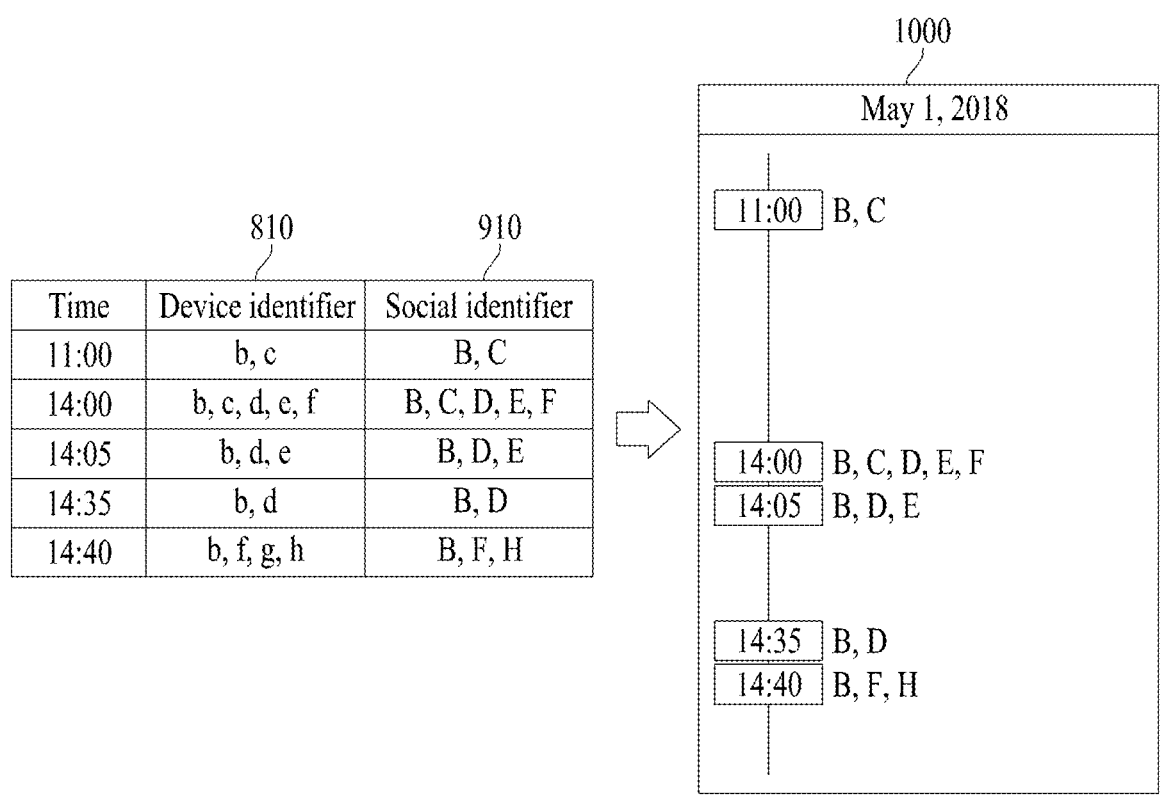
FIGS. 10 and 11 illustrate examples of describing a process of providing a social identifier according to some example embodiments.
Figure 11:
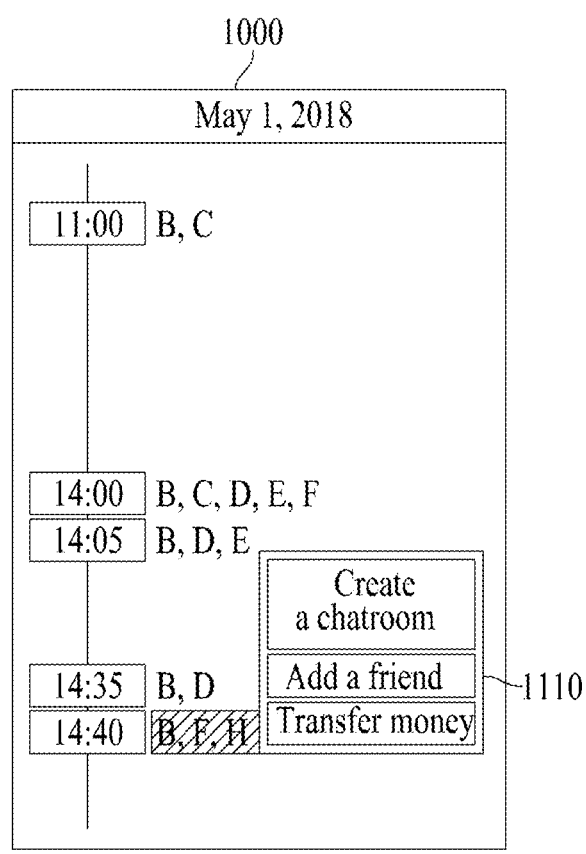

FIGS. 10 and 11 illustrate examples of describing a process of providing a social identifier according to some example embodiments.

Referring to FIG. 10, the social identifier provider 330 may provide a search result screen 1000 in which social identifiers included in the list of social identifiers 910 are grouped based on a time unit at which corresponding device identifiers are stored. Here, as described above, the list of social identifiers 910 is acquired based on an SNS relationship of the user of the electronic device 110 with respect to the list of device identifiers 810 corresponding to a search condition input from the user of the electronic device 110. That is, the social identifier provider 330 may display, on the search result screen 1000, acquaintances, for example, friends present nearby the user of the electronic device 110 on a date on which the electronic device 110 conducted a search.

Referring to FIG. 11, in response to a selection on at least one group or at least one social identifier on the search result screen 1000 by the user of the electronic device 110, the social identifier provider 330 may provide a menu list 1110 that includes providable functions or services. In response to a menu selection through the menu list 1110, a social identifier selected by the user of the electronic device 110 may be used to create a chatroom, add a friend, and/or transfer money.

Figure 12:
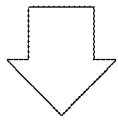
FIG. 12 illustrates another example of describing a process of providing a social identifier according to some example embodiments.

FIG. 12 illustrates another example of describing a process of providing a social identifier according to some example embodiments.

Referring to FIG. 12, the social identifier acquirer 320 may extract the list of device identifiers 810 corresponding to a search condition input from the user of the electronic device 110 from among device identifiers that are collected by the device identifier collector 310 and stored in the storage space 800 of the electronic device 110, and then may calculate a statistical value 1200 representing a storage count for each device identifier included in the list of device identifiers 810. The social identifier acquirer 320 may transfer the entire list of device identifiers 810 to the server 150 or may transfer at least a portion of the list of device identifiers 810 corresponding to a desired condition, for example, three times or more (e.g., device identifiers that have been collected three times or more within a search period), based on the statistical value 1200.

The server 150 may detect, from the identifier matching table 700, a social identifier corresponding to each device identifier included in the list of device identifiers 810 transferred from the electronic device 110. Here, the server 150 may select a social identifier corresponding to an SNS relationship of the friend range preset or alternatively, given by the user of the electronic device 110 and may provide the selected social identifier to the electronic device 110.

Figure 13:
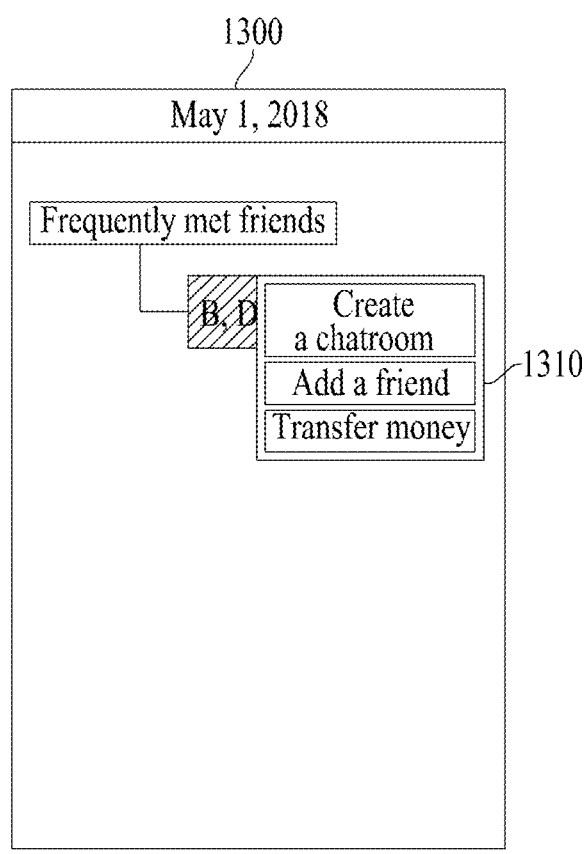
FIG. 13 illustrate another example of describing a process of acquiring a social identifier according to some example embodiments.

FIG. 13 illustrate another example of describing a process of acquiring a social identifier according to some example embodiments.

Referring to FIG. 13, the social identifier provider 330 may provide a search result screen 1300 on which social identifiers acquired from the server 150 are sorted based on the statistical value 1200 about a device identifier corresponding to each social identifier. The social identifier provider 330 may display, on the search result screen 1300, statistical information about friends present nearby the user of the electronic device 110 as a search condition (e.g., in response to the search condition) input from the user of the electronic device 110, such as, for example, a friend the user most frequently met on a specific date or at a specific place, a friend the user most frequently met during lunchtime.

Referring to FIG. 13, in response to a selection on at least one social identifier on the search result screen 1300 by the user of the electronic device 110, the social identifier provider 330 may provide a menu list 1310 that includes providable functions or services. In response to a menu selection through the menu list 1310, a social identifier selected by the user of the electronic device 110 may be used to create a chatroom, add a friend, and/or transfer money. According to some example embodiments, the electronic device 110 may (e.g., in response to the menu selection) create a chatroom including a user of the electronic device 110 and another user corresponding to the selected social identifier, add the other user to a friend list of the user, transfer money from the user to the other user, and/or transfer money from the other user to the user.

Conventional devices and methods for exchanging messages enable a user of a social network to exchange messages with other users of the social network with which the user has a friend relationship. However, the conventional devices and methods enable this messaging based on the user's specific selection of associated identifiers of the other users. Accordingly, the conventional devices and methods are unable to provide the functionality for messaging between the user and an acquaintance of the user whose associated identifier is unknown to the user.

According to some example embodiments, it is possible to verify and/or identify an acquaintance, for example, a friend nearby in the past based on a short-range wireless communication and an SNS relationship and to provide various functions or services using the same. For example, according to some example embodiments, devices and methods are provided for identifying an acquaintance with whom a user was previously in geographic proximity through the use of short-range wireless communication. Also, according to some example embodiments, devices and methods provide for a social network-related service, such as messaging, between the user and the acquaintance. Accordingly, devices and methods according to some example embodiments overcome the deficiencies of the conventional devices and methods to enable messaging between the user and an acquaintance of the user whose associated identifier is unknown to the user.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but some example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to some example embodiments may be recorded in non-transitory computer-readable media including program instructions to implement various operations of the above-described examples. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method implemented by an electronic device including processing circuitry, the method comprising:
   collecting, using the processing circuitry, a plurality of device identifiers using short-range wireless communication, the plurality of device identifiers identifying a plurality of other electronic devices;
   transferring, using the processing circuitry, at least a portion of the plurality of device identifiers to a server, the portion of the plurality of device identifiers being selected for transfer to the server from among the plurality of device identifiers based on a search condition input to the electronic device;
   acquiring, using the processing circuitry, at least one social identifier from the server, each of the at least one social identifier being associated with a respective social network service (SNS) account, the at least one social identifier corresponding to the portion of the plurality of device identifiers; and
   providing the at least one social identifier through an interface of the electronic device.

2. The method of claim 1, wherein the collecting comprises:
   storing a list of device identifiers collected for each of a plurality of periods, the list of device identifiers storing the plurality of device identifiers in association with time information of a corresponding period among the plurality of periods.

3. The method of claim 2, wherein the collecting comprises:
   collecting a respective device identifier collected by each of the plurality of other electronic devices at the corresponding period from the plurality of other electronic devices through the short-range wireless communication.

4. The method of claim 2, wherein the collecting further comprises:
   storing position information acquired by the electronic device in association with each of the plurality of periods.

5. The method of claim 1, wherein the search condition is specified by a user of the electronic device.

6. The method of claim 1, wherein the server is configured to:
   maintain an identifier matching table comprising a respective identifier pair among a plurality of identifier pairs for each of a plurality of users using the SNS, each of the plurality of identifier pairs matching a respective device identifier and a respective social identifier; and
   detect a set of social identifiers corresponding to the portion of the plurality of device identifiers using the identifier matching table.

7. The method of claim 6, wherein
   the set of social identifiers includes a plurality of social identifiers; and
   the server is configured to select the at least one social identifier from among the plurality of social identifiers based on an SNS relationship of a user of the electronic device.

8. The method of claim 6, wherein
   the set of social identifiers includes a plurality of social identifiers; and
   the server is configured to select the at least one social identifier from among the plurality of social identifiers based on an SNS relationship within a range set by a user of the electronic device.

9. The method of claim 1, wherein the providing comprises:
   grouping and displaying the at least one social identifier based on a time at which a respective device identifier among the plurality of device identifiers corresponding to each of the at least one social identifier is stored.

10. The method of claim 1, further comprising:
    calculating, by the processing circuitry, statistical information about the plurality of device identifiers,
    wherein the providing includes sorting and displaying the at least one social identifier based on the statistical information of a respective device identifier among the plurality of device identifiers corresponding to each of the at least one social identifier.

11. The method of claim 1, wherein the providing comprises:
    providing a function within an SNS or a service linkable to the SNS using the at least one social identifier based on a selection through the interface.

12. A non-transitory computer-readable record medium storing computer-readable instructions that, when executed by at least one processor, cause the at least one processor to perform the method of claim 1.

13. An electronic device comprising:
processing circuitry configured to
collect a plurality of device identifiers using short-range wireless communication, the plurality of device identifiers identifying a plurality of other electronic devices,
transfer at least a portion of the plurality of device identifiers to a server, the portion of the plurality of device identifiers being selected for transfer to the server from among the plurality of device identifiers based on a search condition input to the electronic device,
acquire at least one social identifier from the server, each of the at least one social identifier being associated with a respective social network service (SNS) account, the at least one social identifier corresponding to the portion of the plurality of device identifiers, and
provide the at least one social identifier through an interface of the electronic device.

14. The electronic device of claim 13, wherein the processing circuitry is configured to:
store a list of device identifiers collected for each of a plurality of periods, the list of device identifiers storing the plurality of device identifiers in association with time information of a corresponding period; and
collect a respective device identifier collected by each of the plurality of other electronic devices at the corresponding period from the plurality of other electronic devices through the short-range wireless communication.

15. The electronic device of claim 13, wherein the search condition is specified by a user of the electronic device.

16. The electronic device of claim 13, wherein the server is configured to:
maintain an identifier matching table comprising a respective identifier pair among a plurality of identifier pairs for each of a plurality of users using the SNS, each of the plurality of identifier pairs matching a respective device identifier and a respective social identifier, and
detect a set of social identifiers corresponding to the portion of the plurality of device identifiers using the identifier matching table.

17. The electronic device of claim 16, wherein
the set of social identifiers includes a plurality of social identifiers; and
the server is configured to select the at least one social identifier from among the plurality of social identifiers based on an SNS relationship of a user of the electronic device.

18. The electronic device of claim 13, wherein the processing circuitry is configured to:
group and display the at least one social identifier based on a time at which a respective device identifier among the plurality of device identifiers corresponding to each of the at least one social identifier is stored.

19. The electronic device of claim 13, wherein the processing circuitry is configured to:
calculate statistical information about the plurality of device identifiers; and
sort and display the at least one social identifier based on the statistical information of a respective device identifier among the plurality of device identifiers corresponding to each of the at least one social identifier.

20. The electronic device of claim 13, wherein the processing circuitry is configured to:
provide a function within an SNS or a service linkable to the SNS using the at least one social identifier based on a selection through the interface.

* * * * *